March 14, 1950     E. F. ROSSMAN     2,500,708

SHOCK ABSORBER

Filed Aug. 26, 1946

INVENTOR
EDWIN F. ROSSMAN
HIS ATTORNEYS

Patented Mar. 14, 1950

2,500,708

UNITED STATES PATENT OFFICE 2,500,708

SHOCK ABSORBER

Edwin F. Rossman, Dayton, Ohio, assignor to General Motors Corporation, Detroit, Mich., a corporation of Delaware Application August 26, 1946, Serial No. 693,031

8 Claims. (Cl. 188—88)

This invention relates to improvements in direct acting, hydraulic shock absorbers.

It is among the objects of the present invention to provide a direct acting hydraulic shock absorber in which the full area of the fluid displacement member or piston is utilized on the compression stroke, thereby increasing its effectiveness.

By using the entire area of the piston during the compression stroke especially, lower unit pressures may be utilized than is possible in similar shock absorbers.

Some of the advantages of the shock absorber of the present invention over those of standard design are as follows:

(1) The orifice provided in the rebound valve carried by the piston is effective to control fluid displacement on both rebound and compression strokes of the piston.

(2) An orifice in the main compression valve (top valve in valve cage) is effective on compression strokes only. Larger effective orifices may be used without affecting the fluid transfer to the rebound chamber than is possible in other designs of shock absorbers of this same type. This is due to the provision of a lower valve having no orifice.

(3) The lower compression valve, controlling pressures which are effective on the rod area only, may be used to provide a positive minimum control only which is required when the shock absorber is used in connection with certain types of suspensions. This is accomplished by providing a valve which will cause higher pressures to be established than are necessary for fluid transfer to the rebound chamber.

Further objects and advantages of the present invention will be apparent from the following description, reference being had to the accompanying drawings, wherein a preferred embodiment of the present invention is clearly shown.

Figures 1, 2:
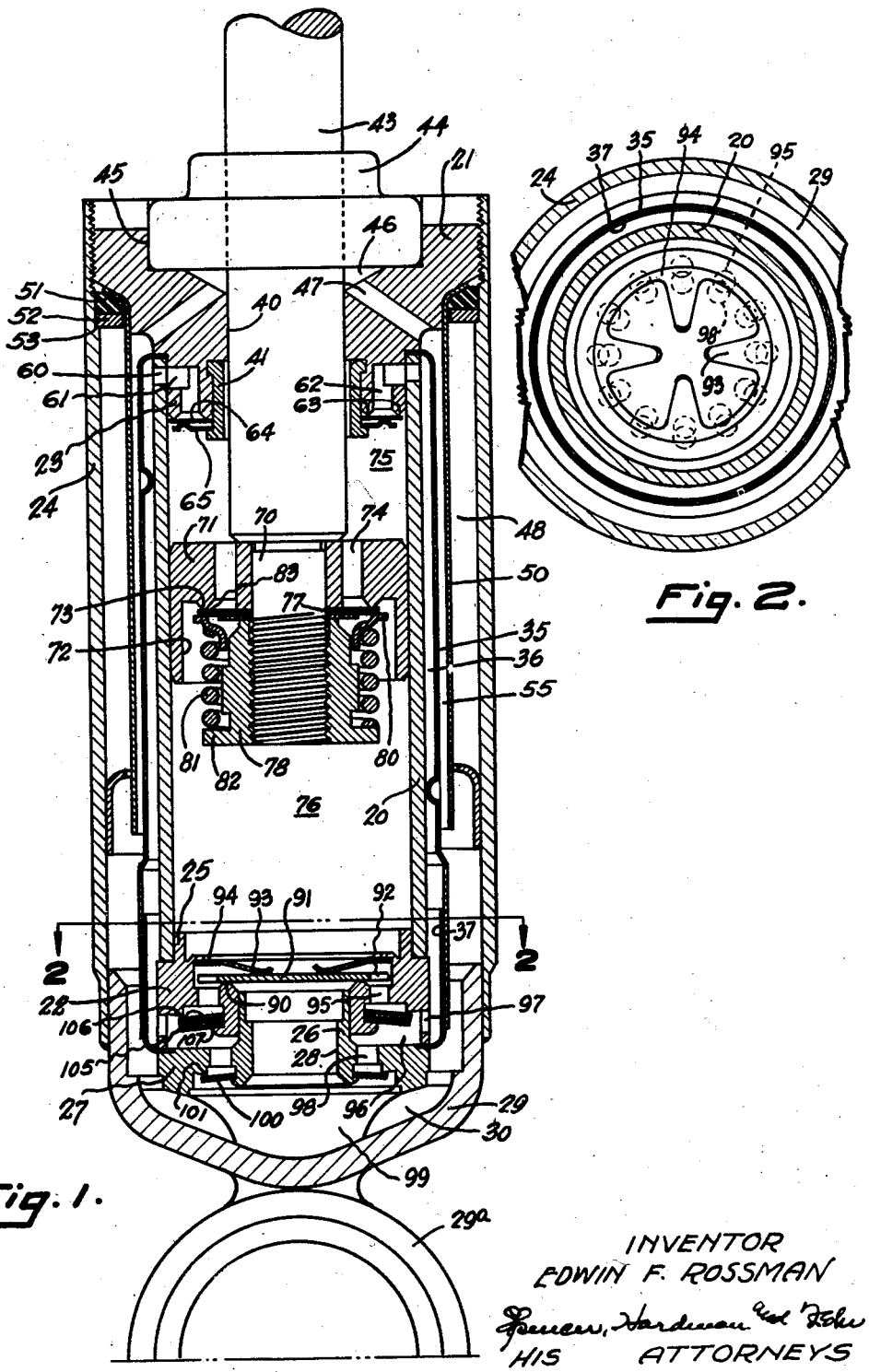
Fig. 1 is a longitudinal sectional view of a direct acting, hydraulic shock absorber embodying the present invention.
Fig. 2 is a fragmentary, cross sectional view taken along the line 2—2 of Fig. 1.

Referring to the drawings, the working cylinder is designated by the numeral 20, and is provided with a head member 21 at one end and a valve cage at the other said valve cage comprising two interfitting parts 22 and 27. The head member 21 has a reduced diameter portion 23 which is press fitted into the end of the cylinder. The greatest diameter portion of the head member 21 is threaded to be received in the interiorly threaded end of the outer casing tube 24. The valve cage part 22 has a reduced diameter portion 25 which press fits into the end of the cylinder opposite the head member 21. The valve cage part 22 has a central opening into which the central hub portion 26 of the cage part 27 is press fitted and this hub portion in turn is centrally apertured as at 28. A cup member 29 fits into the end of the tubular casing 24 and is secured thereto by welding or any other suitable manner. Inside this cup member 29 there are provided spaced ribs 30 upon which the cage member 27 rests.

A tubular member 35 is concentrically arranged around the cylinder 20 so as to form a fluid passage 36 therebetween. The one end of the tubular member 35 is flared inwardly to provide an annular flange which is clamped between the end of the cylinder 20 and the head member 21. At the end of the tubular member 35 adjacent the valve cage part 22 an inner sleeve 37 is secured tightly within the tubular member 35, this sleeve having an inwardly extending, annular flange which is clamped between the main body portion 22 of the valve cage and the part 27 of said valve cage. Thus the tubular member 35 is clamped against each end of the cylinder and held in position so as to form the annular fluid passage space 36 around the cylinder 20.

The head member 21 is centrally apertured as at 40, the inner end of this aperture being counterbored to receive the bearing 41. Aperture 40 slidably supports the piston shaft 43 which extends from the outside of the shock absorber through the opening 40 and the sleeve 41 therein into the interior of the cylinder. A packing gland 44 of any suitable design is inserted in recess 45 in the outer end surface of the head member 21. A space 46 is formed directly beneath the packing gland, said space having fluid passages 47 leading therefrom into the space 48 between the outer casing tube 24 and the tubular member 35. This space 48 is referred to hereinafter as the fluid reservoir.

A baffle tube 50, of shorter length than the tube 35, has one end flared which fits against a sloping surface of the head member 21 and is held tightly against said surface by a packing ring 51 tightly pressed against the flared end of the tubular member 50 by a collar 52 resting against a shoulder 53 within the tubular casing 24. Head member 21 is screwed into casing 24 to compress the packing ring 51 and thus cause it to urge the flared end of tube 50 tightly against said head member. The tubular member 50 as shown in Fig. 1 forms an annular space 55 between itself and the tubular member 35, this annular space being in communication with the fluid reservoir 48 whereby any fluid leaking past the bearing 41 and the piston rod and entering the space 46 may return to the reservoir via passages 47 and the annular space 55.

Openings 60 are provided in the cylinder adjacent the end thereof engaging the head member 21, these openings communicating with an annular groove 61 in the annular surface of the head member 21 fitting within the cylinder end. This annular groove 61 communicates with a series of holes 62 in the inner end surface of the head member 21, said holes being arranged in a circular row. Two concentric ridges 63 surround the inner ends of openings 62 and form a valve seat. A disc valve 64 is normally urged to rest upon the annular seat 63 of all the holes 62 by the comparatively light disc spring 65 seated upon an outwardly extending annular flange 66 on the sleeve 41. Thus valve 64 normally maintains all of the holes 62 closed against communication with the interior of the cylinder, but any pressure upon valve 64 from passages 62 will move said valve against the effect of spring 65 to disengage the seats 63 of holes 62 and thereby provide communication between said holes and the interior of the cylinder.

The inner end of the piston rod 43 is reduced in diameter as at 70, the outer end thereof being threaded. The piston block 71 fits upon said reduced diameter portion 70. This piston block 71 is recessed as at 72, the inner end of said recess having an annular ridge 73 providing a valve seat. A plurality of through passages 74, arranged in a circular row in the piston, provide communication between the upper working chamber 75 and the lower working chamber 76 of said cylinder. The openings communicating with the lower working chamber 76 lie within the confines of the annular seat 73 on the piston 71. A multiple disc valve 77 is pressed against the inner recessed surface of the piston 71 by a nut 78 fitted upon the threaded end of the piston rod, this multiple disc valve 77 normally engaging the annular seat 73 to maintain the through passages 74 in the piston closed against communication with the lower working chamber 76. An abutment sleeve 80 is urged into engagement with the multiple disc valve 70 by a spring 81 interposed between said abutment collar or ring 80 and an outwardly extending flange 82 on the nut 78. Thus it may be said that the multiple disc valve 77 is loaded by the spring 81 which maintains the multiple disc valve 77 in engagement with the annular seat 73 on the piston 71 at a predetermined pressure. The disc of valve 77, engaging the seat 73 has a notch at its outer edge providing a metering orifice 83.

The valve cage portion 22 has an annular ridge 90 surrounding its central opening, this ridge forming an annular seat for the intake valve 91 provided with notches 92 at its outer edge to form fluid flow spaces past this valve under certain conditions. Valve 91 is yieldably maintained in engagement with its seat 90 by spring fingers 93 formed on the ring 94 secured to the valve cage portion 22 by swaging a portion of said valve cage over said ring 94. A plurality of openings 95 are provided in the valve cage portion 22 and arranged in a circular row. These provide communication between the lower working chamber 76 of the cylinder and space 96, which space is formed by recesses in the valve cage portions 22 and 27 when said portions are assembled together as shown in Figure 1. Space 96 is in communication with the fluid flow passage 36 by openings 97 in the valve cage portion 22. Openings 98 arranged in a circular row in the valve cage portion 27 lead directly into the cup chamber 99 which is in communication with the fluid reservoir 48. A multiple disc valve assembly 100 secured to the valve cage portion 27 at its inner peripheral edge has its outer portion yieldably urged into engagement with the central ridge 101, forming a seat on the valve cage member 27. The inner annular edge of the multiple disc valve 100 is so secured in the valve cage portion 27 that it is normally flexed to cause its outer peripheral surface normally to engage the valve seat 101 at a predetermined pressure.

Valve cage portion 22 has a multiple disc valve assembly 105 secured to its central portion in such a manner that this disc valve is normally flexed so that its outer annular surface engages an annular valve seat 106 on the valve cage portion 22 at a predetermined pressure. The disc of valve assembly 105, directly engaging the seat 106 has a notch forming metering orifice 107. From this it will be seen that the multiple disc valve 105 normally, with the exception of the orifice 107, shuts off communication between the lower working chamber 76 of the cylinder and the space 96 of the valve cage assembly, while the space 96 is maintained out of communication with the reservoir via the passage 98 in the valve cage portion 27 by the multiple disc valve 100. Also the fluid passage 36 between the cylinder and tube 35 is normally held out of communication with the upper working chamber 75 by the spring pressed valve 64.

The present shock absorber is designed to control the approaching and separating movements of two relatively movable members, as for instance the frame and axle of a vehicle. When the shock absorber is installed on a vehicle, the piston shaft 43 is attached in any suitable manner and by any suitable means to the frame of the vehicle and the cup-shaped member 29 is secured to the axle of the vehicle by the mounting ring 29a in any suitable manner. When the frame and axle of the vehicle move to approach each other, the piston 71 is thrust downwardly into the cylinder as regards Fig. 1 so as to exert a pressure upon the fluid in the lower working chamber 76. When the frame and axle of the vehicle separate due to the action of the vehicle springs therebetween, then the shock absorber is actuated so that the piston 71 is moved upwardly in the cylinder as regards Fig. 1 to exert a pressure upon the fluid in the upper working chamber 75.

Assuming that the piston is being urged downwardly into the cylinder to exert a pressure upon the fluid in the lower working chamber 76, it may be seen that only such an amount of fluid will pass through the piston passage 74 as will be metered by the orifice 83 inasmuch as valve 77 will be maintained in engagement with its piston seat 73. At the same time orifice 107 in disc valve 105 will pass a metered amount of fluid from the chamber 76 into the space 96. At a predetermined fluid pressure within the lower working chamber 76 fluid acting against the multiple disc valve 105 through the passage 95 of the valve cage portion 22 will flex said multiple disc valve 105 to disengage it from its valve seat 106 thereby to establish a restricted flow of fluid into the space 96 within the valve cage 22. Any fluid pressure in space 96 will be exerted upon valve 100 through the passages 98, and against valve 64 through the passages 97—36—60—61 and 62. Inasmuch as valve 64 is so constructed that it will take a lesser fluid pressure to move it from its seat than the valve 100, valve 64 will first be moved to establish a fluid flow from the space or chamber 96 through fluid flow passages, 97, 36, 60, 61 and 62 into the upper working chamber 75. However, more fluid is displaced from the lower working chamber 76, than can be received by the upper working chamber 75, due to the presence of the piston rod 43 within said chamber 75 and therefore fluid displaced by said piston rod 43 will cause the valve 100 to be next lifted from engagement with its seat 101 thereby to establish a fluid flow from the chamber 96 through the passages 98 into the cup space 99 past the ribs 30 into the fluid reservoir 48. Restriction to the flow of fluid from the working chamber 76 past the valve 105 will cause the shock absorber to offer resistance to the approaching movements of the frame and axle of a vehicle which, as was assumed, causes the downward movement of the piston 71 in the cylinder 20.

When the spring and axle of the vehicle move to separate, a reverse action of the shock absorber obtains. Now the shock absorber is actuated through what is called its rebound stroke during which time the piston 71 is moved toward the head member 21 and exerts a pressure upon the fluid in said upper chamber. Valve 64 will be maintained upon its seat 63 surrounding passage 62 and thus no fluid may exit through the head member. However, fluid pressure will now be exerted through openings 74 in the piston against the multiple disc valve 77, a metered flow first being established by orifices 83, and when said pressure reaches a predetermined value the disc valve 77 will be flexed against the effect of the spring 81 loading it and thereby to disengage valve 73 from its seat and establish a restricted flow of fluid from the upper chamber 75 past valve 77 into the lower working chamber 76.

Insufficient fluid will be transferred from the upper chamber to fill the lower chamber due to the presence of the rod therein. In order to compensate for this insufficiency, the piston will create a pressure condition in the lower working chamber 76, causing the valve 91 to be lifted against the effect of spring fingers 93 thereby to disengage its seat and permit a fluid to flow from the reservoir and space 99 in the cup through the center opening 98 in the valve cage, past the valve 91 into the lower working chamber 76, thereby providing a sufficient fluid supply in this chamber and prevent starving thereof.

From the aforegoing it will be seen that applicant has provided a simple and efficient double acting, hydraulic shock absorber in which during the rebound stroke controlling fluid flows only through the piston, while on the reverse or compression stroke no fluid, excepting a metered small amount will flow through the piston.

While the embodiment of the present invention as herein disclosed constitutes a preferred form, it is to be understood that other forms might be adopted, all coming within the scope of the claims which follow.

What is claimed is as follows:

1. An hydraulic shock absorber having a cylinder divided into two working chambers by a piston which is reciprocated by a rod extending into one end of the cylinder; a fluid containing reservoir; means in the piston for transferring fluid from the one chamber directly into the other as the piston moves in one direction; means establishing a flow of fluid from the reservoir into said other chamber concurrently with the transfer of fluid through the piston; a fluid passage in communication with both cylinder chambers and with the reservoir; a valve normally shutting off communication between said fluid passage and the said other chamber but operative as the piston is moved toward said valve to establish a restricted flow of fluid into said fluid passage; a spring loaded valve normally shutting off communication between said fluid passage and the rod containing cylinder chamber but operative at a predetermined fluid pressure to permit fluid to enter into said rod containing chamber; and a valve normally shutting off communication between the fluid passage and the reservoir but operative at a greater fluid pressure than the spring loaded valve and in response to fluid displaced by the rod, to permit fluid to flow into the reservoir.

2. In an hydraulic shock absorber, the combination with a cylinder divided into two working chambers by a piston which is adapted to be reciprocated by a rod extending into one end of said cylinder; of a fluid containing reservoir; means in the piston for permitting fluid to flow from the rod containing chamber into the other chamber as the piston is moved in one direction; means supported by the cylinder for causing fluid to flow from the reservoir into said other chamber in response to said piston movement in one direction; a duct in communication with the reservoir and both working chambers; three valves respectively closing the duct to both chambers and the reservoir, one of said valves opening said other chamber to the duct in response to a predetermined fluid pressure in said other chamber as the piston moves in the other direction, the second valve opening the rod containing chamber to the duct in response to a predetermined fluid pressure in said duct, the third valve opening the duct to the reservoir in response to an increased pressure in said duct due to fluid displacement by the piston rod.

3. In an hydraulic shock absorber, the combination with a cylinder divided into two working chambers by a piston which is adapted to be reciprocated by a rod extending into one end of said cylinder; of a fluid containing reservoir; means in the piston for permitting fluid to flow from the rod containing chamber into the other chamber as the piston is moved in one direction; a valve cage at one end of the cylinder; a valve in said valve cage, for permitting fluid to flow from the reservoir into said other chamber as the piston moves in said one direction; a fluid duct in communication with both working chambers and the reservoir; a pressure relief valve in the valve cage normally closing the said other chamber from said duct, but operative at a predetermined fluid pressure, as the piston moves in the other direction, to permit fluid to flow from said other chamber into the duct; a valve carried at the cylinder end opposite the valve cage, operative at a predetermined pressure in the duct, to permit fluid to flow with the rod containing chamber; and another valve in the valve cage, operative at a higher pressure in the fluid ducts, to permit fluid displaced by the rod to flow from said duct into the reservoir.

4. An hydraulic shock absorber comprising in combination, a cylinder having a head member at one end and a valve cage at the other, a rod slidably extending through the head member; a piston in the cylinder, secured to the rod and forming two working chambers within the cylinder; valved passages in the piston providing for a flow of fluid through the piston in one direction only; a fluid containing reservoir, a valve in the valve cage normally closing communication between the one working chamber and the reservoir, said valve being operative to permit fluid to flow substantially unrestricted from the reservoir into said one chamber as the piston is moved to open its own fluid flow passages; a pressure relief valve in the valve cage operative as the piston is actuated to exert pressure upon the fluid in said one chamber to establish a restricted fluid flow from said chamber; and two normally closed valves, the first being operative in response to fluid flow from the pressure relief valve, to permit a flow into the rod containing chamber, the second valve being operative in response to fluid displacement by the piston rod to permit fluid to flow from the pressure relief valve into the reservoir.

5. In an hydraulic shock absorber the combination with a cylinder having a head member at one end and a valve-cage at the other; of a piston in said cylinder attached to a rod slidably extending through the head member; fluid passages in the piston normally closed by a single valve which is operative to permit a flow of fluid through said piston passages in one direction only when the piston is moved toward the head member; a fluid containing reservoir; a valve in the valve cage operative to permit a flow of fluid from the reservoir into the cylinder when the piston moves toward the head member, said valve closing the valve cage when the piston moves in the opposite direction; a casing forming a fluid chamber around the cylinder, said chamber being in communication with the rod containing end of the cylinder by way of passages in the head member and with the other end of the cylinder and the reservoir by communicating passages in the valve cage; a high resistance valve normally shutting off fluid flow from the said other end of the cylinder to said fluid chamber; a lesser resistance valve shutting off communication between said fluid chamber and the reservoir; and a valve of less resistance to fluid pressure than said last two mentioned valves, shutting off communication between the fluid chamber and the rod containing end of the cylinder.

6. An hydraulic shock absorber having a cylinder divided into two working chambers by a piston which is reciprocated by a rod extending into one end of the cylinder; a fluid containing reservoir; a valved passage in the piston providing the sole means for discharging fluid from the one working chamber as the piston moves in one direction; means operative to establish a flow of fluid from the reservoir into the second working chamber in response to piston movement in said one direction; a pressure relief valve providing the sole means for discharging fluid from said second chamber in response to movement of the piston in the other direction; a fluid conduit, independent of the reservoir, operative to deliver fluid, discharged through the pressure relief valve, to the said one chamber; and a second pressure relief valve in communication with said fluid conduit, operative to deliver fluid, not receivable by said one chamber, to the reservoir.

7. An hydraulic shock absorber having a cylinder divided into two working chambers by a piston which is reciprocated by a rod extending into one end of the cylinder and through the one working chamber; a fluid containing reservoir; means in the piston for transferring fluid from the one chamber directly into the second chamber as the piston moves in one direction; a unitary valve mechanism at one end of the cylinder said mechanism having three separate valves, one valve being operative to establish a flow of fluid from the reservoir into said one working chamber as the piston moves in said one direction, the second valve being operative in response to fluid pressure in the second working chamber to establish a restricted flow of fluid from said second chamber into a duct separate from the reservoir and in communication with the said one chamber, the third valve being operative, in response to fluid pressure in said duct, to establish a flow of the fluid, not receivable by said one chamber due to the presence of the rod therein, into the reservoir.

8. An hydraulic shock absorber having a cylinder divided into two working chambers by a piston which is reciprocated by a rod which extends into and through the one chamber; a fluid containing reservoir; fluid flow controlling mechanism in the piston, providing the sole means operative to establish a flow of fluid from the rod containing chamber into the second chamber in response to movement of the piston in one direction; and fluid flow control mechanism at one end of the cylinder, communicating directly with the second chamber and reservoir, and with the said one chamber by means of a duct independent of the reservoir, said control mechanism consisting of a valve operative to establish a flow of fluid from the reservoir into the second chamber as the piston moves in said one direction, and of a second valve operative to establish a restricted flow of fluid from said second chamber into said duct as the piston moves in the other direction, and of a third valve operative to permit the excess fluid flowing out of the second valve and not receivable by the rod containing chamber to flow from the duct into the reservoir.

EDWIN F. ROSSMAN.

REFERENCES CITED

The following references are of record in the file of this patent:

UNITED STATES PATENTS

| Number | Name | Date |
|---|---|---|
| 2,035,954 | Focht | Mar. 31, 1936 |
| 2,036,623 | Focht | Apr. 7, 1936 |
| 2,199,880 | Elliott | May 7, 1940 |
| 2,332,161 | McIntyre et al. | Oct. 19, 1943 |